United States Patent [19]

Bennett et al.

[11] Patent Number: 5,051,736
[45] Date of Patent: Sep. 24, 1991

[54] OPTICAL STYLUS AND PASSIVE DIGITIZING TABLET DATA INPUT SYSTEM

[75] Inventors: William E. Bennett; Stephen J. Boies, both of Mahopac, N.Y.; Anthony R. Davies, Romsey, England; Karl-Friedrich Etzold, Briarcliff Manor; Todd K. Rodgers, Chappaqua, both of N.Y.

[73] Assignee: International Business Machines Corporation, Armonk, N.Y.

[21] Appl. No.: 373,298

[22] Filed: Jun. 28, 1989

[51] Int. Cl.⁵ ............... G09G 1/28; G08C 21/00; G06K 9/00
[52] U.S. Cl. ............... 340/707; 340/706; 340/708; 340/712; 178/18; 178/19; 382/13; 382/58
[58] Field of Search ............... 340/706, 707, 709, 710, 340/712; 250/237 R, 237 G; 178/18, 19; 382/13, 58, 59, 60; 235/454, 456, 472, 462

[56] References Cited

U.S. PATENT DOCUMENTS

| | | | |
|---|---|---|---|
| 4,364,035 | 12/1982 | Kirsch | 340/710 |
| 4,390,873 | 6/1983 | Kirsch | 340/710 |
| 4,409,479 | 10/1983 | Sprague et al. | 250/237 G |
| 4,488,679 | 12/1984 | Bockholt et al. | 235/472 |
| 4,495,646 | 1/1985 | Gharachorloo | 382/13 |
| 4,521,772 | 6/1985 | Lyon | 340/710 |
| 4,521,773 | 6/1985 | Lyon | 340/710 |
| 4,543,571 | 9/1985 | Bilbrey et al. | 340/710 |
| 4,546,347 | 10/1985 | Kirsch | 340/710 |
| 4,647,771 | 3/1987 | Kato | 250/237 R |
| 4,868,373 | 9/1989 | Opheij et al. | 235/454 |
| 4,939,354 | 7/1990 | Priddy et al. | 235/456 |

OTHER PUBLICATIONS

S. K. Hoo; "Coordinate Locator", in the IBM Technical Disclosure Bulletin, vol. 18, No. 5, Oct. 1975, pp. 1498-1499.
Murphy et al.; "Optical Digitizing Stylus" in the IBM Technical Disclosure Bulletin, vol. 27, No. 5, Oct. 1984, pp. 2806-2807.

Primary Examiner—Jeffery A. Brier
Assistant Examiner—Chanh Nguyen
Attorney, Agent, or Firm—Roy R. Schlemmer

[57] ABSTRACT

A stylus and table X-Y data input system for a video display system. The pen includes an optical styling having a suitable pickup mechanism and the tablet is passive in nature and provides direct digitized data readout. Absolute positional information is encoded in binary form in the tablet in such a fashion that the pen position upon the tablet is automatically determinable by illuminating a particular area of the tablet and reading off the digitized X-Y coordinate data stored therein. The pen and supporting hardware/software are rotationally insensitive so that the pen may be held in any desired position comfortable to a user. The system provides greatly improved resolution, sampling rate accuracy and general robustness particularly for such applications as text recognition as well as a wide variety of other graphical input uses.

15 Claims, 10 Drawing Sheets

OPTICAL STYLUS AND PASSIVE DIGITIZING TABLET DATA INPUT SYSTEM

FIELD OF THE INVENTION

The present invention relates to two dimensional data input devices typically used with computer systems in conjunction with a video display subsystem. More particularly, it relates to such devices for producing X-Y positional information which can be directly utilized to store or display the pattern of stylus movement on a suitable tablet or surface.

BACKGROUND OF THE INVENTION

X-Y graphical input devices are relatively well-known in the computer arts for inputting graphical data such as handwritten text, symbols, drawings, etc., where it is desired to convert the instantaneous position of the stylus on a tablet into the X-Y coordinates which represent the absolute position of the stylus on the tablet surface. It is also frequently desirable to have a transparent X-Y digital input tablet which can be mounted directly on the surface of or over a flat screen display device such as are becoming widely available.

Currently available transparent digitizing tablets have not been found to be suitable for hand written text recognition in terms of resolution, accuracy, robustness in typical office environments, and cost. Inductive tablets operating at radio frequencies tend to have problems with ambient electrical noise from computer systems likely to be in the office area, display terminals, and other sources, as well as field distortions from the user's hand and/or nearby metallic objects such as hand jewelry. Tablets employing resistive surfaces for ranging are prone to manufacturing difficulties in obtaining uniform resistivity, and drift in the resistivity over time because of dirt, moisture, and aging. Acoustic tablets suffer distortions from hand contact on the surface, as do capacitive tablets. Laser scanning tablets are bulky, expensive, noisy, and have potentially unreliable mechanical parts. All of these tablets have active tablet surfaces that need to be attached to the computer system by a cable, and generally limit the use of the scribing instrument to a single tablet. The system of the present invention avoids all of these difficulties.

The prior art is replete with many different types of stylus-tablet input systems for entering data into a video display system in many different forms. Most of the systems capable of providing X-Y information to the video display utilize active tablets wherein the means for sensing the stylus position is built into the tablet per se and requires a physical connection between tablet and the system. Systems such as these merely utilize a passive stylus although some systems known in the art require both an active stylus and tablet.

The prior art in the area of inert or passive tablets fall into one of two classes. The first although not really a pen input system would merely use a non-specific tablet or surface and utilize some means of entering relative positional data into the system such as by means of the well known mouse inputs. However, such a system although it could possibly work, is not practical for the input of hand written data or the like.

The second class of tablets which would normally utilize a stylus type of pick up device again gives relative position of the stylus beginning at some predetermined origin on the tablet surface and as the stylus is passed over the surface physical pick up means are provided such as by grid lines to indicate relative movement of the stylus in the X or Y direction. Such systems are not capable of producing sufficiently dense data e.g., suffer from lack of resolution for such applications as for example, hand written or complicated and detailed graphical drawings.

There are many different types of digitizing tablet-stylus systems utilizing an active tablet wherein some physical or electrical parameter of the tablet is changed by the presence of the stylus on the surface of same. However these systems result in tablets which are fairly bulky and usually non-transparent. They also suffer from lack of resolution, low sampling rate and considerable inaccuracy or drift in the values produced and generally are unsuitable for such applications as handwritten text input and the like.

PRIOR ART

The following eight patents are exemplary of current state-of-the-art tablet-stylus data input systems and are not discussed in detail as their differences from the present invention are obvious from a cursory examination.

U.S. Pat. No. 4,647,771
U.S. Pat. No. 4,546,347
U.S. Pat. No. 4,521,773
U.S. Pat. No. 4,521,772
U.S. Pat. No. 4,409,479
U.S. Pat. No. 4,390,873
U.S. Pat. No. 4,364,035
U.S. Pat. No. 4,543,571

An article by S. K. Hoo entitled "Coordinate Locator", in the IBM Technical Disclosure Bulletin, Volume 18, Number 5, October, 1975, pages 1498–1499 discloses an optical stylus and passive digitizing tablet system which is similar in overall concept to the present invention in that it generally discloses a passive tablet having X-Y positional data stored therein. The article also discloses a light pen which both illuminates the surface and picks up the X-Y data located in the area of the pen. However as will be noted from the article no method for providing X-Y data of the density anticipated in the present invention is disclosed. In fact, the system of the article is really a cursor locating device (e.g., "a locate function") and does not anticipate the use of the pen for raw data input applications such as the above described handwritten text, etc. Also the contact switch 11 indicates that this is a point and read device rather than a continuous positional data input device. It will further be noted that a limited amount of data processing electronics is shown, video technology is indicated, which would severely limit the sampling rate of such a device. It is apparently assumed that the pick up device or pen would be properly oriented with respect to the data orientation on this surface. Thus no means are shown or suggested for handling the situation where the pen is oriented in some non-orthogonal direction with respect to the tablet.

Also as will be noted from the date of this article there were no means known for obtaining a packing factor of better than a few thousand coordinates per square inch whereas with the presently disclosed system up to several hundred thousand coordinates per square inch are possible with recording techniques such as used for example in compact disk technology.

In the article by A. S. Murphy and J. A. Wiseman entitled "Optical Digitizing Stylus" in the IBM Technical Disclosure Bulletin, Volume 27, Number 5, October, 1984, pages 2806-2807 discloses an optical stylus similar in some respects to that of the present invention in that it utilizes fiber optics for both a light source and as a very coarse pick up device. However, the stylus is intended to pick up data on the tablet which "should have X axis and Y axis lines of different colors which will enable the optical system to detect the direction of movement". Thus the disclosed system is essentially one which provides relative movement information in terms of the number of X or Y lines crossed rather than giving specific X-Y coordinates as in the case of the present invention.

SUMMARY AND OBJECTS

It is a primary object of the present invention to provide a data input mechanism for a display system, computer or the like comprising an optical stylus and a passive digitizing tablet.

It is a further object of the invention to provide such system which directly and continuously generates digitized coordinate code input directly related to the instantaneous position of the stylus on the tablet surface.

It is yet another object of the invention to provide such a system characterized by a very high density of digitized coordinate code data on a transparent tablet of at least 500 coordinate code pairs per linear inch.

It is a further object of the invention to provide such a stylus-tablet data input system wherein the stylus is not rotationally nor tilt angle (stylus/tablet) constrained.

It is another object of the invention to provide such a stylus-tablet data input system which is uniquely adapted for high resolution input applications and which system is robust, accurate, provides a high sampling rate and may be produced at a reasonable cost in current available technology.

The objects of the present invention are accomplished in general by a stylus and tablet X-Y data input system for producing digitized coordinate stylus location data for a video display system or the like. The pen includes an illumination and optical pick up means for sensing digitized X-Y coordinate data encoded in binary form and recorded on the tablet in such a fashion that the pen position upon the tablet is automatically determinable by illuminating a predetermined area of the tablet and reading the digitized X-Y coordinate data stored therein. The system includes means for compensating for relative rotational variations between the stylus and the tablet so that the system is not sensitive to variations in the rotational orientation of the pen. Further means are provided to ensure that a complete coordinate pair for a single location is produced during a given sampling period. Utilizing the concepts of the present invention, up to 250,000 digitally encoded coordinate pairs may be encoded in the tablet surface per square inch which provides extremely high resolution thus making the system suitable for high quality graphical data input such as handwritten text and the like.

DESCRIPTION OF THE PREFERRED EMBODIMENT

The overall X-Y data input system of the present invention comprises a unique flat tablet and a positional input device or stylus. According to the teachings of the invention, the tablet is passive, i.e., has no electrical or other direct functional connection to the computer system and the stylus is active, i.e., is functionally connected to the system. The use of the term "computer system" here refers to the system that uses or consumes digital position information and could be any such system. The computer system plays no role other than as a consumer of the information. The passive digitizing tablet physically contains X-Y positional information permanently stored in the tablet in readable form and this information is picked up by a unique active optical stylus which is in turn connected to the display system by any of the usual means for transmitting electrical signals, e.g. copper cable, fiber optic cable, or modulated RF signals.

The optical stylus can be used to collect microscopic image information into a digital memory. Either infrared or visible light can be used. The resolution is on the order of a few microns and the size of the viewed area is a few hundred microns. The stylus may be stationary or moving at speeds up to about a meter per second, and a new image is obtained as often as several hundred per second. The stylus contains a light source for illuminating the surface being inspected. While it is unlikely that the detector will be overloaded by ambient light, if necessary, a wavelength selective filter can be included so that the only desired frequency activates the detection circuitry.

The stylus may be used on the surface of an optically transparent thin sheet of glass or plastic that constitutes the passive digitizing tablet. Within the surface of the sheet are optically detectable patterns or Tablet Address Cells (TACs) representing binary codes that indicate the X-Y position information. These codes may be integrated into the front face of a display surface, or the digitizing tablet could be a separate surface. By employing the optical stylus to read the binary codes, dedicated logic circuitry or a microprocessor decodes the X-Y positional data and determines the location of the stylus as it moves across the tablet. Such a system offers better resolution and sampling rate than any of the low cost digitizing tablets available today, and will not exhibit the noise, drift, and distortion problems of inductive, capacitive, resistive, laser scanning, and acoustic tablets.

Figure 1:
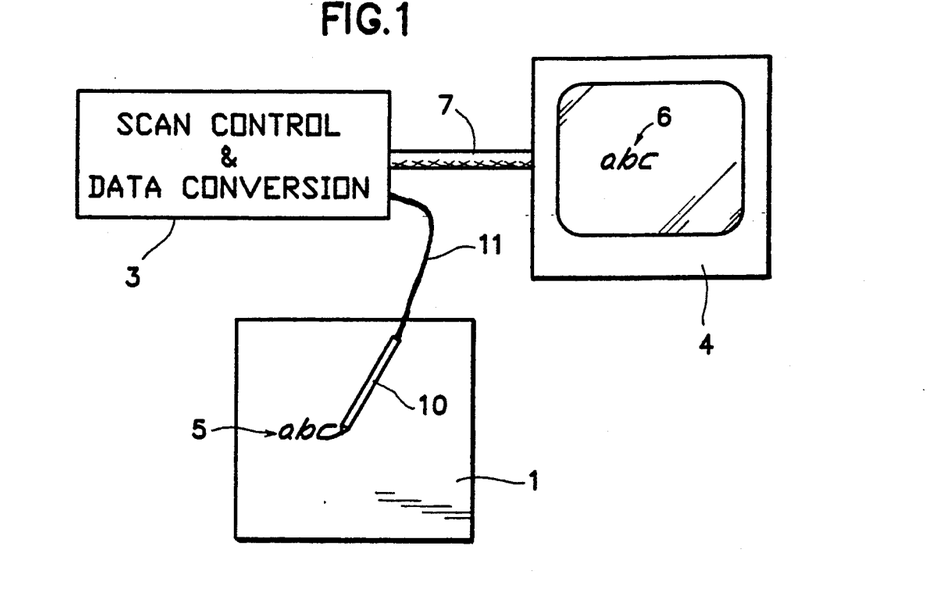
FIG. 1 comprises a diagrammatic view of the overall stylus-tablet X-Y digital data input system of the present invention coupled to a conventional video display system.

Referring to FIG. 1, the overall system organization is clearly shown including the passive tablet 1, the optical stylus 10, communication link 11 connecting the pen to the scan control and scan conversion unit 3. The X-Y data is transmitted to the computer display system 4 via cable 7 and could simply be connected to the frame buffer input architecture as will be well understood by those skilled in the art where this data would subsequently be utilized for any purpose including regeneration of the image 6 traced out by the stylus. The image 6 is an example of the reproduction on the display of the image 5 traced on the tablet.

The scan control and conversion electronics will be described subsequently but briefly includes the mechanism for conducting a three level spiral scan of the total TAC image collected or sensed by the stylus via the control system electronics which searches for unique demarking boundaries which separate the individual TACs. When detected, these boundaries are utilized to both compensate for the rotational orientation of the pen with respect to the tablet and also to extract the proper data for a single TAC located closest to the middle of a particular scan area.

Figure 2:
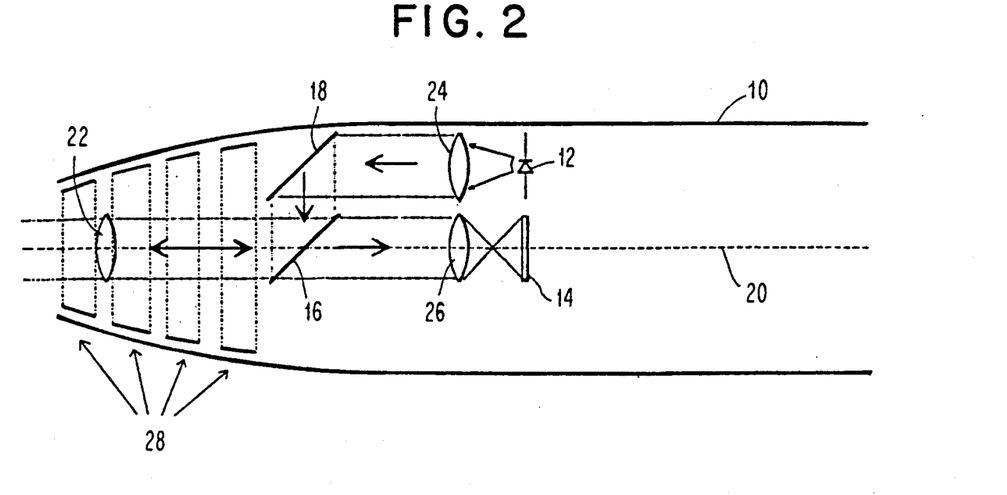
FIG. 2 comprises a cross-sectional view of the internal construction of a preferred embodiment of the optical stylus of the present invention.
Figure 3:
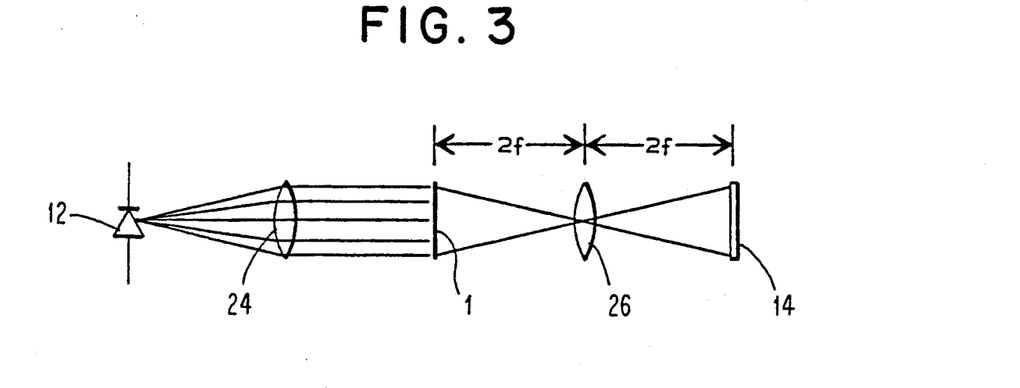
FIG. 3 comprises a diagram of the folded out optical path of the pick up system of the stylus of FIG. 2.

The optical design of the pen 10 is illustrated in FIG. 2 and comprises a light source 12 (LED or laser) with a wavelength of 820 mm or longer and a CCD image pickup device 14. The light to and from the target will travel along the same path. The rays are combined and separated with built-in beam splitter 16. The latter has a 45° reflector 18 integrally mounted with it so that the input and output beams from the light source 12 and CCD 14, respectively, travel parallel to the mechanical axis 20 of the pen. It will be desirable to split the lens function so that the main imaging function is done by the objective lens 22, while 24 and 26 perform the corrections necessary to accommodate the optics to the point source, LED or laser, and the distributed imaging device, CCD. For purposes of analysis, it will be assumed that only 24 and 26 are present, i.e., 26 forms the 2f 1:1 imaging system and 24 expands and collimates the beam (see FIG. 3).

Figure 4:
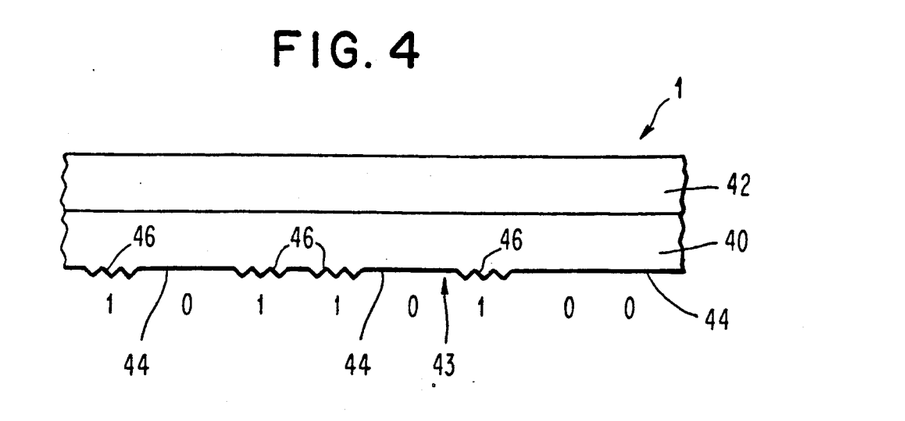
FIG. 4 comprises a cross-sectional view of a small segment of the passive digitizing tablet surface of the present invention illustrating how the individual coded bits of the coordinate code may be recorded on said tablet surface.

It is assumed that the tablet, FIG. 4, is constructed such that the pixel code bits (PCBs) representing zeros are comprised of the flat portion 40 of the tablet substrate which is treated for maximum transmission with an antireflection [AR] coating 43. The pixel code bits representing ones are arrays of small corner cubes 46, which are molded into the back surface. It is desirable to degrade the reflective quality of the cubes by roughening the surfaces. This avoids excessive visible reflections from the back surface but still provides the desirable property of corner cubes, or retroreflectors i.e., incident angle=exiting angle. The coded back surface can most conveniently be molded out of plastic material 40 replicating a metal master (stamper in CD record manufacturing parlance) which is used for molding (stamping) the signal-bearing surface. If desired, this plastic part can be laminated to a glass layer 42 to provide good wear resistance. To avoid reflections from the interface, the refractive index of the glass and the plastic should be reasonably well matched. Some of the arguments ignore the thickness and refractive index of the glass plate but the effect of the glass will be included when necessary.

For an actual system (consisting of the pen and the tablet), it is necessary to consider the optical power requirements to obtain adequate signal-to-noise ratio. It will be assumed that a 6 dB S/N is satisfactory. The other requirement is that the optical system design be able to resolve the picture elements contained in the TACs and have reasonable depth of focus (insensitivity to tilt).

Consider first the optical power requirements. The LED must illuminate more or less uniformally 9 TAC's, thus lens 24 is determined in aperture given an image distance of 8 mm (2f). If a surface emitter LED is assumed, its light output is isotropic. Let the numerical aperture (NA) of the illuminating lens 24 be 0.5. Therefore, about 25% of the available light from the LED will be collected. The efficiency of the lens is assumed to be 90%.

The light is incident on the top surface (x0.96) of the tablet and then on the TACs. The signal contrast will be due to the difference in reflected light power due to the corner cubes and the AR-coated back surface. It will be again noted that areas covered with corner cubes represent ones (1) and the spaces between them represent zeros (0). It will be desirable to somewhat degrade the reflection from the corner cubes to make the tablet more visually appealing (reduce glare). A scattering efficiency of 80% will next be assumed. The job of the imaging lens 26 is to collect the scattered light and to image the pattern onto the photoreceptor array.

Figure 5:
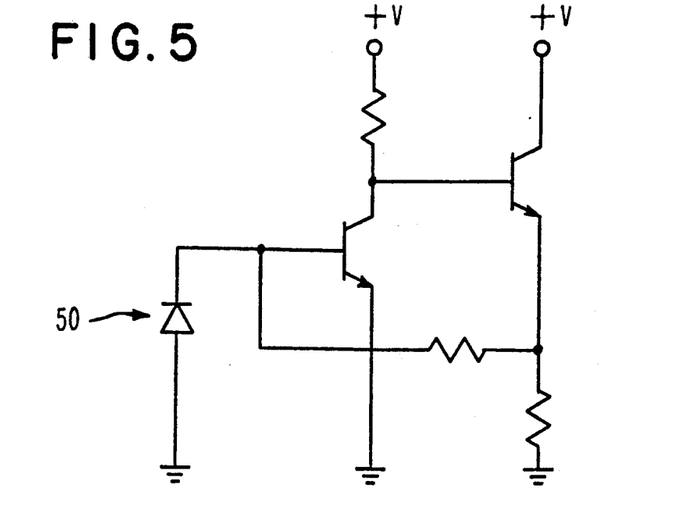
FIG. 5 is a schematic diagram of an integrated photo-detector front-end circuit for the photo-detector 14 of FIG. 2.

A CCD 14 is assumed but an integrated array of photodiodes 50 with the appropriate preamps is feasible (see FIG. 5). The array would have to be interrogated through a matrixing switch. For low intensities, the reverse photodiode bias which is provided by the emitter is adequate, otherwise the bias may have to be raised with additional diodes. The bias has to be large enough to prevent saturation in the strongest ambient light which can be encountered. The photo-preamp front-end has to also have enough dynamic range (need for agc) to handle the fall-off of the return signal for increasing angles away from the normal (roughening of surfaces). Appropriate circuit parameters would be well known to those skilled in the art.

A 2f or a 1:1 imaging system has convenient dimensions, giving reasonable picture element sizes, readily compatible with present integrated , circuit techniques. A relatively low NA of 1/36 has been chosen, as discussed later. Let the CCD resolution be twice that of the target so that typical photodiodes are in the 9$\mu$ range. discrete photodetector system is chosen, it will be desirable to make the latter's resolution equal to that of the target coupled with the appropriate restoration algorithms. Whereas in a normal imaging situation the price paid in optical power for the low numerical aperture is very severe (approximately proportional to $1/NA^2$), for the present system essentially all the light is collected because the incident light is nearly collimated and the corner cubes preserve this collimation, leading to a very high optical efficiency system. A collection loss of 0.75 is assumed.

Having outlined the optical chain, the power incident on a photodetector element can now be estimated and be compared to the equivalent thermal noise power present at the input of the photo-preamplifier. The system loss consists of contributions from lens 24, the panel (tablet), and lens 26:

$$\text{Loss} = \underset{NA}{0.25} \times \underset{\text{lens 24}}{0.9} \times \underset{\text{glass}}{0.96} \times \underset{\text{scattering}}{0.8} \times$$

$$\underset{\text{glass}}{0.96} \times \underset{\substack{\text{coll. loss} \\ \text{incl. 26}}}{0.75} \times \underset{\substack{\text{splitter} \\ \text{glass}}}{0.96^2} \times \underset{\substack{\text{50/50 splitter} \\ \text{loss}}}{0.25} = 0.025$$

The loss above takes account of the total power incident on the photodetector array. If it is assumed that there is one photodetector element per TAC bit, then the power on an individual element is $P_T/\#$ of elements $\times \eta$. The factor, $\eta$, is the percentage of the total area of the photoarray which is actually filled with photosensitive elements. This factor will range between 0.1 and 0.5, depending on the amount of space taken up by auxiliary devices such as connections, etc. For the following discussion 49 code dots per TAC are assumed, a field of viewing covering 9 TACs, and $\eta$ of 0.5. Thus:

$$P_{det} = P_{IN} \times \text{Loss} \times P_d =$$

$$P_{IN} \times 0.025 \times \frac{1}{49} \times \frac{1}{9} \times 0.5 = P_{IN} \times 2.8 \times 10^{-5}$$

It is now possible to estimate whether this is compatible with the speed requirements of the circuit (greater speed means greater photodetector bandwidth, hence greater allowed input noise power or noise equivalent power, NEP).

The input bandwidth can be found as follows. The pen is 1 m/sec and 1 TAC cycle is 36µ long:

$$T = \text{time per cycle} = \frac{36\mu}{1 \text{ m/sec}} = 36 \text{ } \mu\text{sec}$$

The corresponding frequency is:

$$\frac{1}{T} = 27 \text{ kHz}$$

To find the NEP, assume a photo front-end as shown in FIG. 5. This detector is based on coupling a transconductance amplifier such as a Texas Instruments TIEF-152 with a suitable low-leakage PIN diode. A larger feedback resistor can be used because of the lower bandwidth, assume 100K. This value should result in an equivalent noise current of approximately $0.32 \text{ pA}/\sqrt{\text{Hz}}$.

The quantum efficiency, $\eta$, of a HP 4207 PIN diode is $\sim 0.2 \text{ } \mu A/\mu W$ at 1000 nm or $$I_{Photo} = \eta P_{OPT}$$

$$P_{OPT} = \frac{I_{Photo}}{\eta} = \frac{0.32 \text{ } pA}{200 \text{ } pA\mu W} = \frac{0.32 \mu W}{200} = 1.6 pW$$

in a 1 Hz bandwidth. The equivalent noise power in the required 27 kHz bandwidth is:

$$1.6 pW \times \sqrt{27 \times 10^3} = 262 \text{ } pW$$

or $0.52 \text{ } \mu W$ for a 6 dB S/N ratio.

Combining this with a power loss of $2.8 \times 10^{-5}$, it is found that 14.7 mW is required to obtain adequate S/N. This amount of power can readily be supplied by commercially available LED's or lasers. The optical efficiency of the system can be further improved by a factor of 2 by using a combination of a polarizing beam splitter and quarter wave plates. In the present embodiment the usual gain of 4 is not obtained because the incident light is unpolarized.

It is significant to note that the discussion above assumes continuous illumination. In actual use, the tablet system as a whole need produce only a few hundred samples per second. Since a TAC image is captured in less than 36µsec, a conservative estimate of the duty cycle of the light source is 20%, for an average light power of less than 3 mW.

A number of competing facts were considered in designing the optical system. Optimally the pen should:
(1) be as thin as possible
(2) have the greatest tolerance to tilt
(3) exhibit great tolerance to dirt, scratches, and debris on the tablet
(4) be as inexpensive as possible A design in which the input and the returned, reflected light share the same beam path requires an optical system with a beam splitter. In a preferred embodiment of the invention, an optical path in which the beam splitter and one of the lenses in each path are integrated and molded in one piece of optical-grade plastic is provided. The 45° surfaces are coated and when assembled form the beam splitter. This satisfies condition (4). Conditions (2) and (3) are conflicting in that tolerance to imperfections is obtained with a high numerical aperture (NA) system, but depth of focus decreases with increasing NA, favoring a low aperture system. The required resolution is significantly larger than the wavelength, thus the NA does not limit the resolution. We will use tilt as the determining criterion. If this is done, we choose the minimum NA to resolve the TAC bit patterns. The minimum resolvable element in the bit pattern is the dot-to-dot spacing, therefore the resolution is:

$$36\mu = \frac{\lambda}{2} \frac{1}{NA}$$

$$NA = \frac{1}{72}$$

assuming a 1000 nm wavelength. (The illuminating wavelength will be between 820 and 1000 nm, the former value being the common wavelength for GaAlAs LED's. The latter wavelength is more convenient for the design of the antireflection coating, because it is farther away from visible wavelengths.)

The resolution criterion, as given, has only a 3 dB dip between peaks; the NA will be doubled, which will give more than twice the contrast or at least 6 dB discrimination. Thus, the NA chosen is 1/36. The depth of focus, $\Delta Z$, in air is given by:

$$\text{Resolution} = R = \frac{\lambda}{2} \times \frac{1}{NA} = \frac{1\mu}{2} \times 36 = 18\mu$$

$$\text{Depth of focus} = \Delta Z = \frac{R}{2} \times \frac{1}{NA} = \frac{18\mu}{2} \times 36 \approx 0.3 \text{ mm}$$

Based on a focal length of 4 mm and a 2f imaging system, this corresponds to an angular range of 5.7°. There are two ways of increasing the angular range. One is to reduce the resolution requirements which in turn allows a lower NA and thereby a greater depth of focus. The other is to include a focus servo. For example, the requirement for a 45° angular range is that the focal point Z-dimension of the imaging system be variable by a total of 1.55 mm, the apparent path length change in going from normal incidence to 45° incidence in a 2.5 mm panel. A focusing mechanism, based on a lead screw and a DC or stepper motor, could move the CCD 14 by the required amount. The error signal would be generated by ring-shaped photodetectors (FIG. 2) which are wired in such a way as to look for the maximum signal (specular reflection). This signal then can be directly translated into a tilt angle range.

The choice of the focal length is determined by convenience of manufacture of a (plastic) lens, reasonable tolerances, a reasonable stand-off from the target, and the desired magnification. It will be assumed here that the CCD or photodetector array be easily manufacturable and have, therefore, relatively large photodetectors, approximately equal to the elements in the TACs. This requires a 1:1 imaging system, one in which there is a 2f distance between the object and the image. We choose a focal length of 4 mm which gives a reasonable lens-tablet stand-off distance of 4.25 mm based on an n=1.5, 2.5 mm thick panel.

Using the 1:1 system fixes the size of the photodetector array. It must image a 3×3 TAC array (each TAC being 7×7 bits) or have edge dimensions of roughly 0.75 mm. If NA=0.5 as discussed earlier, the focal length of lens 22 is 0.58 mm and the diameter is 1 mm. The LED will be placed at the focal point resulting in a more or less collimated beam of 1 mm in diameter, the same diameter as the lens. The optical efficiency of the system can be improved somewhat by choosing a larger lens but the penalty is a thicker pen.

Figure 6:
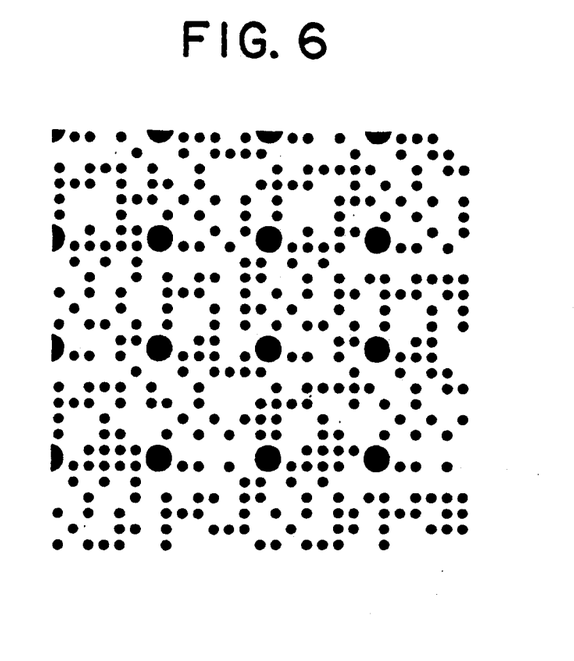
FIG. 6 shows an enlarged portion of the passive tablet surface illustrating a typical coding for 16 TACs.

The active area of the tablet is divided into a matrix of squares called Tablet Address Cells (TACs) (FIG. 6). These TACs contain the digitally encoded X,Y position information as described in the following discussion.

Each TAC is divided into an array of positions, and each position may or may not contain a coded dot. Thus each TAC is identified by a binary code formed by the dots. The corners of each TAC are marked with larger dots, allowing the imaging mechanism to determine the edges of a TAC. The binary code used is free of rotational redundancies, so that the operation of the tablet is independent of the rotation of the stylus. It will be desired to maintain uniform grayness across the tablet, at least for the implementation as a transparent overlay digitizer. This can be accomplished by using only those binary codes that have exactly or approximately half zeros and half ones, causing all TACs to pass the same amount of visible light. The number of extra bits needed in the binary code to do this is not excessive.

Finally, it is possible to add additional bits for error correction, using any of several known techniques.

Although there are numerous ways the binary coding could be done, the herein described preferred embodiment constitutes but one example of a code that has the desired properties and can be converted to a natural binary code for use in the computer (e.g., two's complement) by simple high speed hardware and stored program steps executed in a microprocessor. Although specific numbers are used in the example, the scheme generalizes easily.

Figure 7:
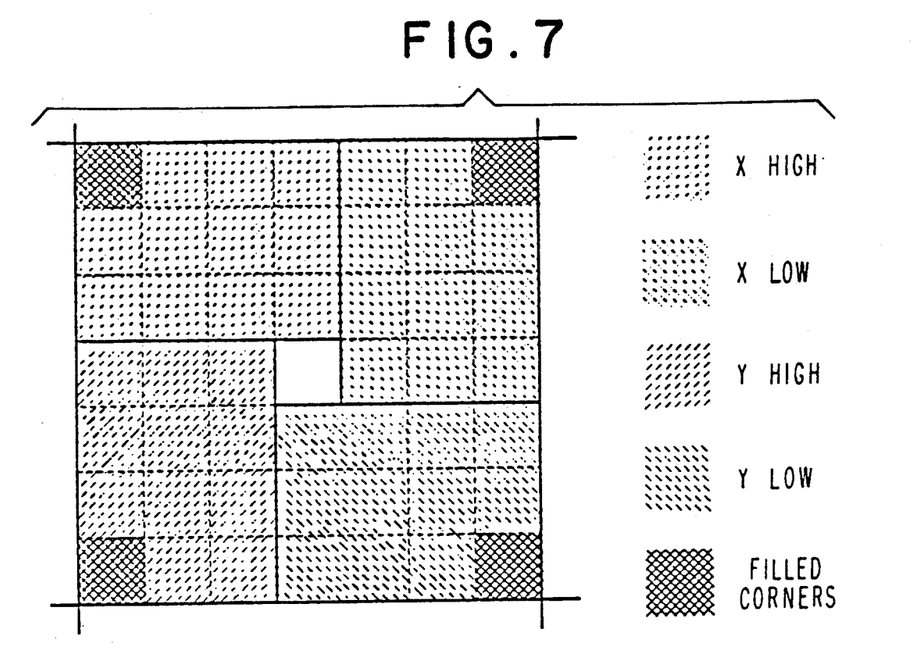
FIG. 7 comprises a diagrammatic illustration showing the data organization within a single tablet address cell (TAC).

Suppose the TAC size is divided into a 7 by 7 array of 49 dot positions (FIG. 7). In each TAC, the four corner dot positions (and white space between corner dots of adjacent TACs) are always filled in to provide the large corner markers. The dot at the center of the TAC is not used. The remaining 44 dots are interpreted in four groups of 11 dots each, located in the four quadrants of the TAC. The quadrants will be used to code the high order half of the X TAC address, the low order half of X, and the high and low order halves of the Y TAC address, in the top left, top right, bottom left, and bottom right quadrants, respectively. This organization allows the TAC address to be determined from any four adjacent TAC quadrants, not necessarily within one TAC. This may be used to reduce the requirement on the size of the field of view of the optical stylus, although it is not used in the herein described embodiment.

Using bit strings of 11 bits, there are exactly 462 patterns that have 5 '1' bits, and 462 that have 6 '1' bits. For this discussion, these are referred to as 5-one codes and 6-one codes. In the four cells of each TAC three codes from one code group (5-one or 6-one) and one code from the other group are used, with the different code group always being in the top left quadrant. This gives the needed rotational independence, since the top left corner of the TAC can always be determined. Adjacent TACs alternate between having a 5-one and a 6-one code in the top left bits in any small region of the tablet. The coding scheme does not include any sophisticated error coding, but does exhibit a simple error detection feature: every valid TAC has either 21 or 23 ones (excluding the corner dots), organized within the TAC in a particular way that can be verified.

The number of unique TAC addresses that can be represented by this coding scheme is the fourth power of 462, or about 45 billion. Since this is some thousands of times the number of addresses needed for typical practical tablets more error recovery redundancy could be added within this coding scheme.

The processing of the image incident on the photodetectors in the stylus can be described in several stages.

First, the image is stored in a digital memory by integrating the signal from the photodetectors over a short time and using a level thresholding technique to make an on/off decision for each PEL (picture element) in the field of view of the stylus. AGC (automatic gain control) will be included to move the processing window of the thresholding circuit into a suitable operating point. This is done by using the average brightness of the visual field of the photodetector to adjust a gain control circuit. Thus, a bilevel digital image of a small region of the tablet is obtained.

Figure 8:
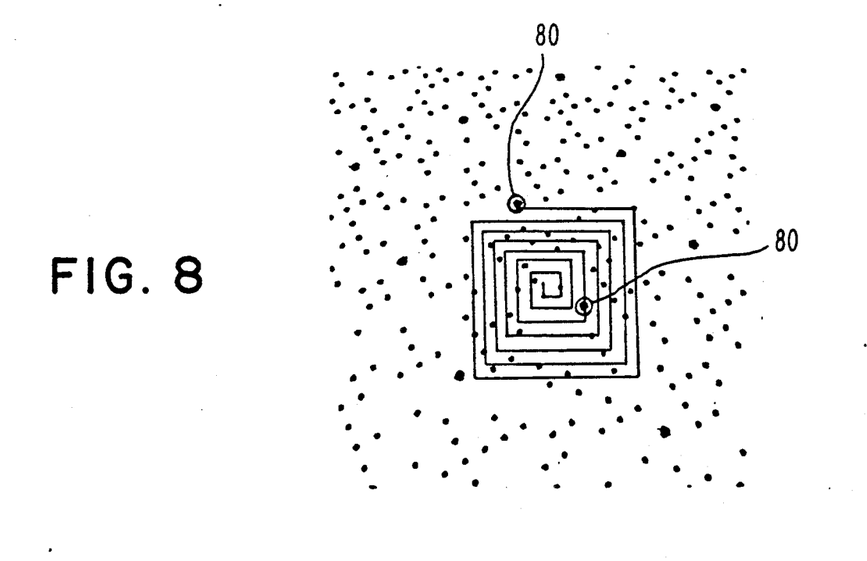
FIGS. 8 and 9 comprises diagrammatic illustrations of the generation of the first, second and third spiral search performed by the scan control mechanism of the present invention to locate and access a complete TAC cell.
Figure 9:
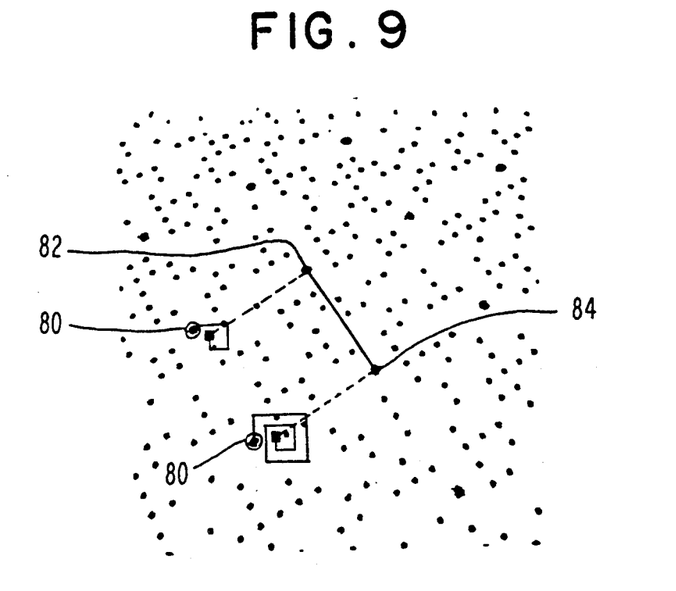
Figure 12:
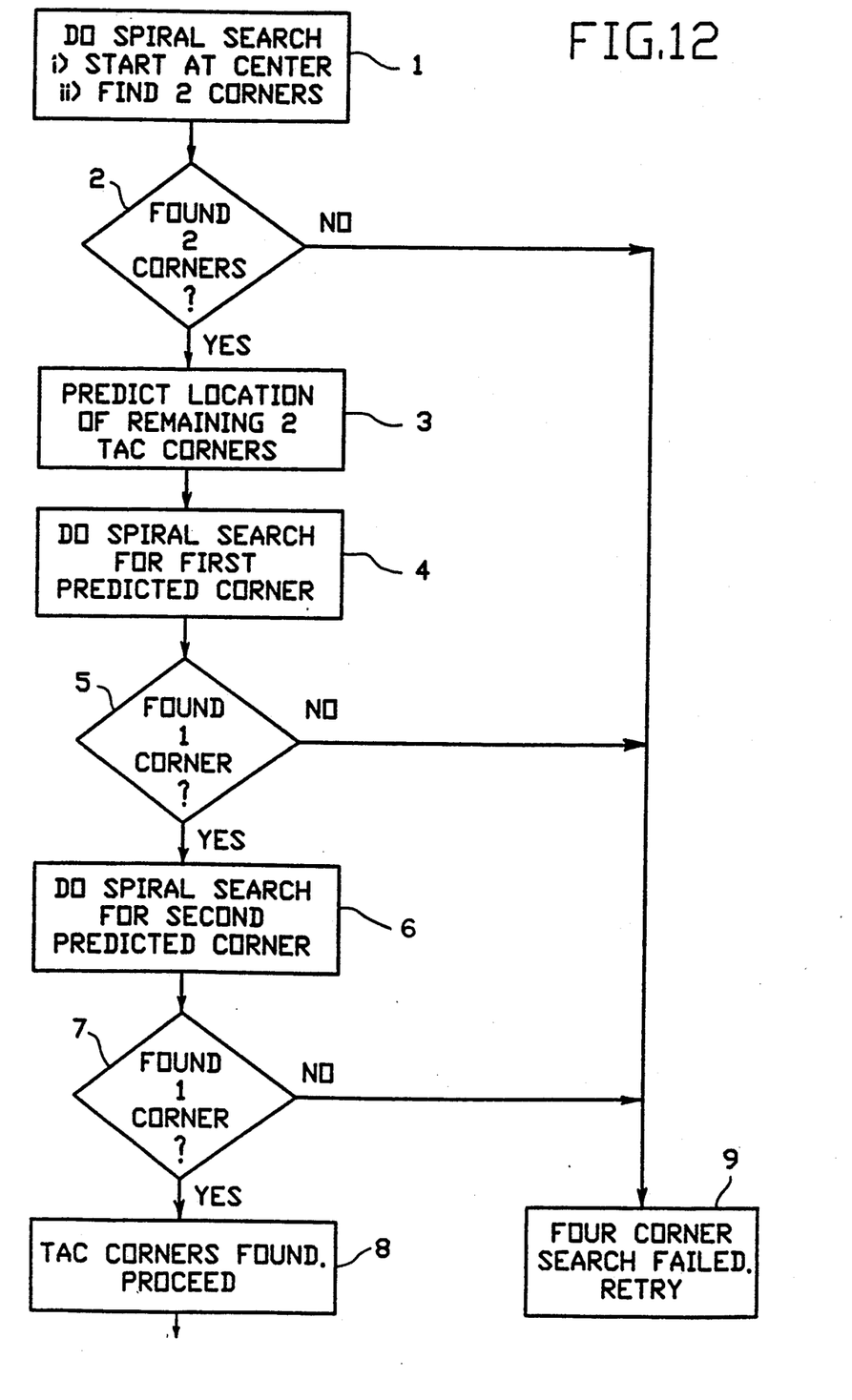
FIG. 12 comprises a flow chart describing the "TAC corner search" procedure.
Figure 13:
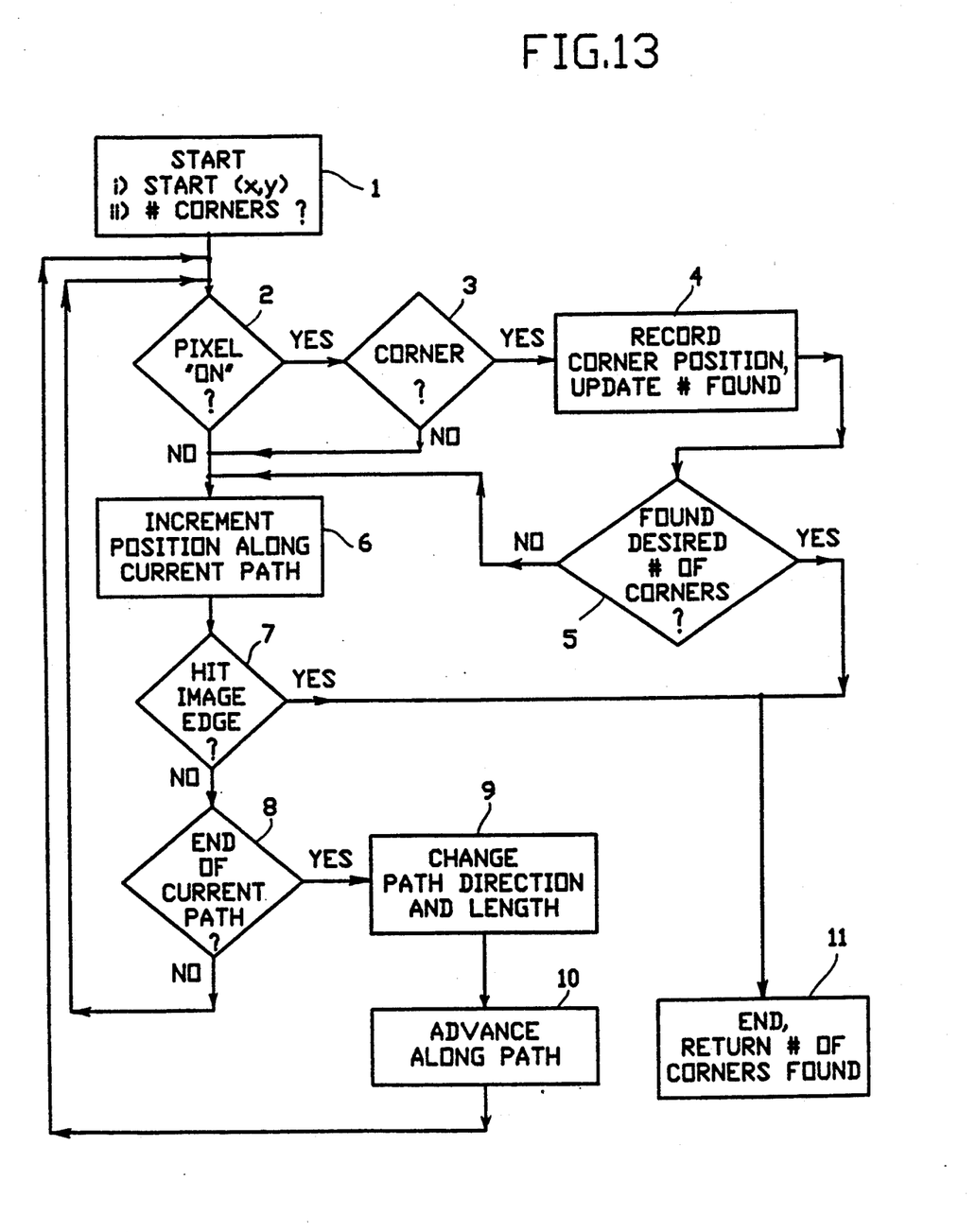
FIG. 13 comprises a flow chart describing the "spiral search" procedure.

Next, the two TAC corner dots 80 nearest the center of the image are located using a spiral search starting at image center (FIGS. 8 and 12). The location and spacing of these two corner dots are used to give a first order approximation of the location of the other two corner dots of the TAC that includes the center of the image. The approximation is simply to offset from each of the two corner dots a distance equal to the separation between the two dots, normal to the line joining the two dots, and in the direction most towards the center of the field of view; i.e., complete the square. Two more spiral searches are done, starting from the approximations of the corners 80, to precisely locate the third and fourth corner dots 82 and 84. (FIGS. 9 and 13)

Figure 14:
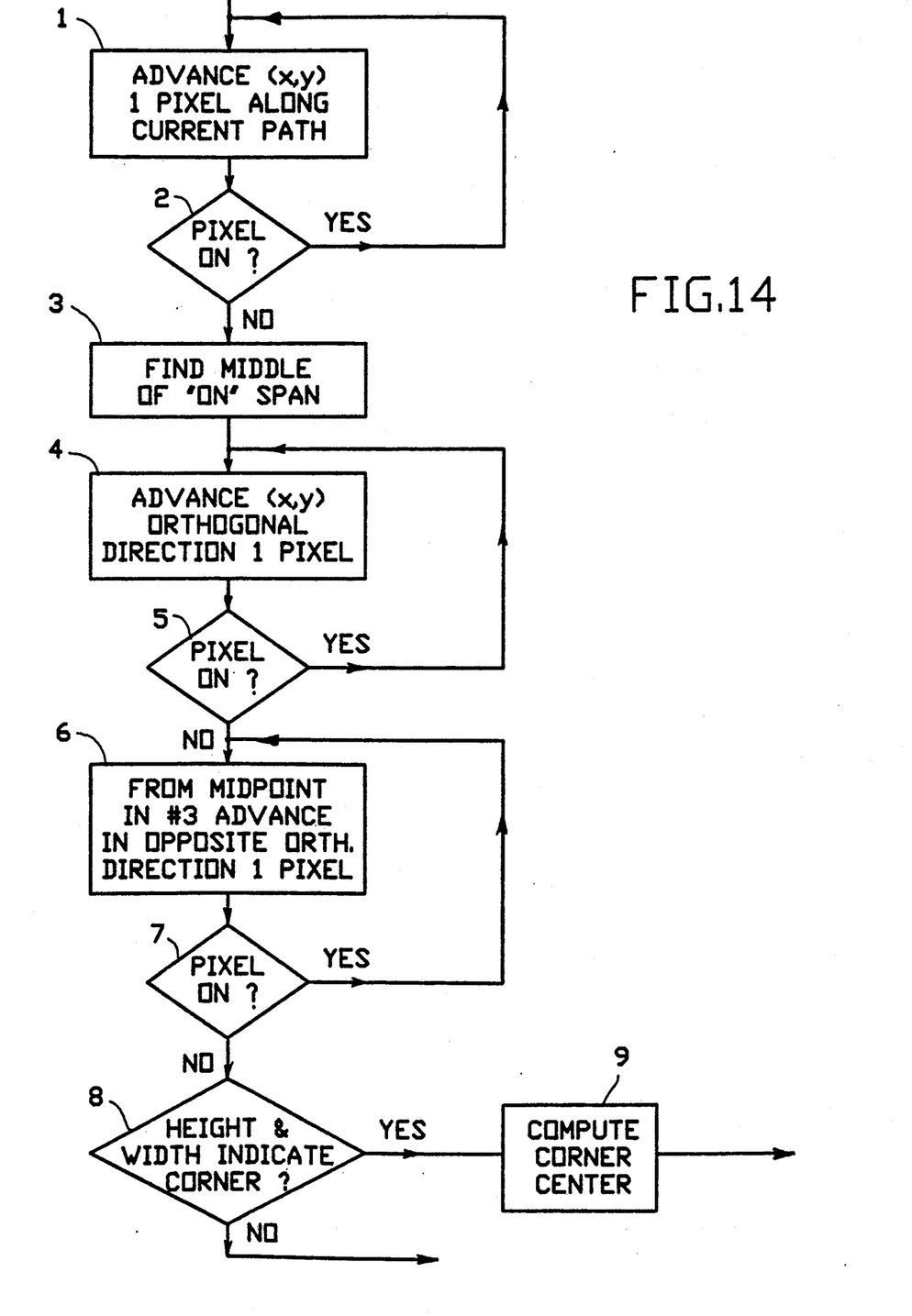
FIG. 14 comprises a flow chart describing the "corner defect" procedure.

The TAC image bounded by the four corner dots is now gridded in a uniform fashion corresponding to the number of dot positions in a TAC (FIG. 10) by the procedure shown in FIG. 14. By reading the PELs in the regions near the intersections of these grid lines, it is determined whether the code dot was present or not, ultimately yielding a string of bits from the TAC.

The bit string is partitioned into the four segments and reordered if necessary as determined by the position of the segment corresponding to the top left corner. Each segment is used to index a lookup table to convert the TAC code bits to TAC address bits in a natural binary counting sequence i.e. to convert from the DC balanced binary code used in the tablet to 2's complement form usable in the computer system. This procedure is described in FIG. 15.

The center of the field of view of the stylus corresponds to the actual position of the stylus tip at the time it is sampled (except for parallax error). This point in turn corresponds to the center of the digitized image. The real two-dimensional distance from the center of the image to the middle of the acquired TAC is easily determined (within the accuracy of the stylus optics and the resolution of the photodetector array) by locating the image center within the grid lines. This offset is added (algebraically) to the TAC address to arrive at the final tablet readout value of the stylus position.

The image signal integration, thresholding, and transfer to RAM is done in hardware. The special test-increment-repeat hardware to perform the spiral search for corner dots can be fabricated from well known and understood circuitry. These two steps can be accomplished in about 4 milliseconds (estimated) using presently available digital logic technology. The steps to convert the RAM image into a binary digitizer readout can be done in software in another 4 milliseconds, to achieve a sample rate of 125 points per second. If a higher sample rate is needed, two alternating RAM image buffers can be used, and the software processing can run in parallel with image acquisition and corner dot locating, for a sample rate of 250 points per second. These numbers are all estimates, and would depend on the particular RAM devices and microprocessor used, but are in line with components available today.

It is also possible to determine the tilt angle of the stylus (a potentially useful piece of information in some applications) by analyzing the perspective distortion of the TAC shape. More important, using this angle and knowledge of the indices of refraction of the tablet materials, the offset from parallax can be corrected. Note that this does not address the problem of user perceived parallax, only the parallax seen by the stylus optical imaging system. The user's parallax will be a function of the total thickness of the tablet, and the distance to the underlying display, if such is being used. The tablet thickness can be made to be essentially negligible (a few thousandths of an inch) with respect to this problem.

The contact detection problem is resolved as a by-product of the error detection/error correction scheme; when invalid codes are read, the computer system assumes that the stylus is not in contact with the tablet. The image defocusing caused by lifting the stylus from the tablet only a small distance (e.g., about one millimeter in the example below) will cause such errors. The computer system may be programmed to require one or multiple errors before indicating the pen lift condition, as appropriate to the application.

Since the tablet itself is completely passive, this digitizer offers the advantage that the tablet can be placed over any surface. Moreover, multiple tablets may be situated in the work environment at convenient places: on the computer displays, on the desk top, on the drawing board, etc., all readable with the same single stylus. Additional coding could be put in the tablet to allow the computing system to discriminate among the various tablets.

Figure 11:
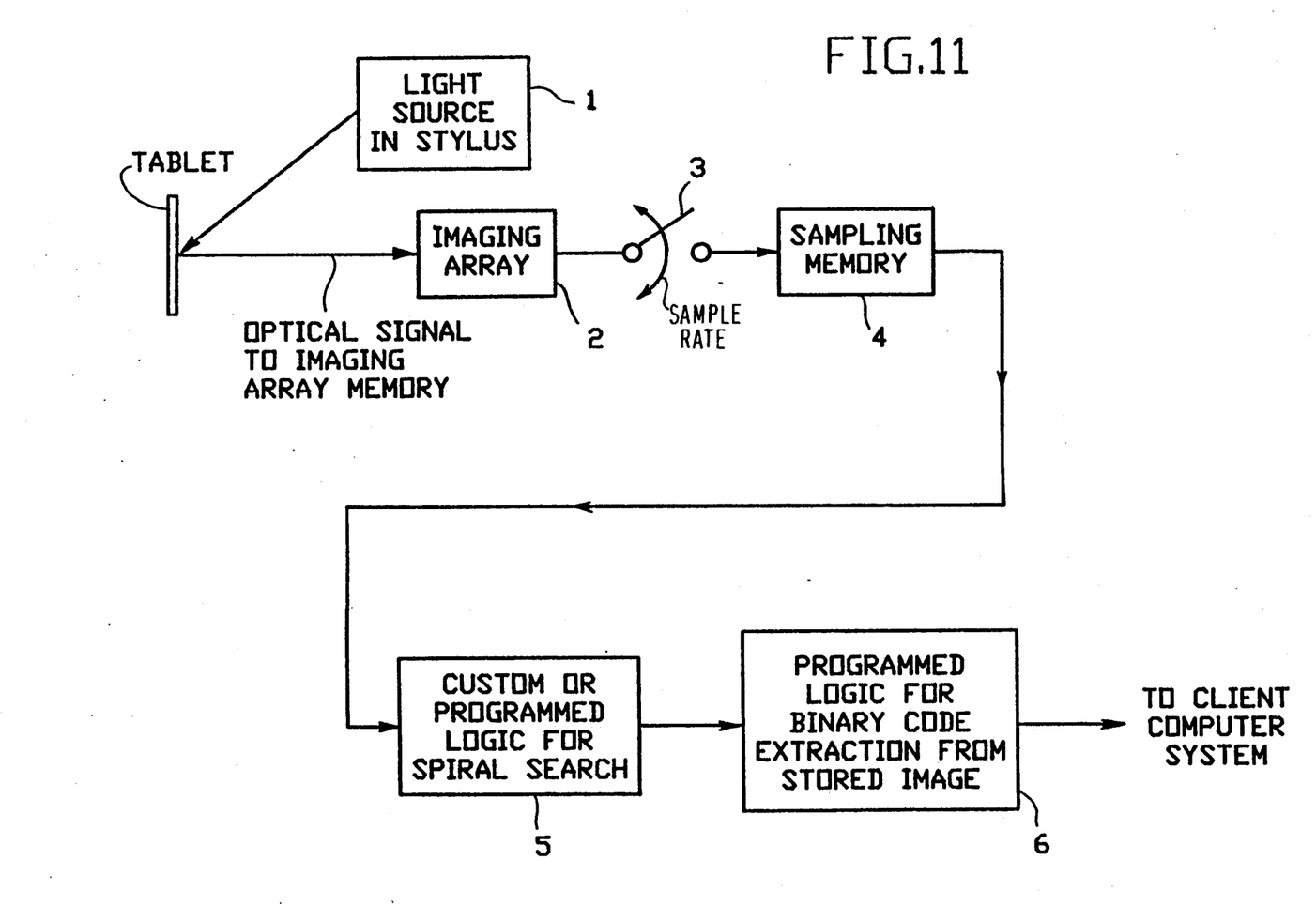
FIG. 11 comprises a high level information flow and data processing diagram of the overall system from the optical pick-up to the final binary code representing the X-Y coordinates of the current stylus location.

FIG. 11 essentially recapitulates the overall operation of the passive digitizing tablet and stylus system of the present invention. It diagrams the information flow from the pick-up stylus to the computer system interface.

Block #1 indicates the pen light source which illuminates the tablet. Block #2 indicates the optical pick-up and imaging means associated with the stylus which is capable of continuously "taking a picture" of the multi TAC area of the tablet. This continuous picture is periodically sampled by the switch 3 and successive images are stored in sampling means 4 where each picture's data is processed by Blocks #5 and #6 to produce successive X-Y binary data coordinate pairs as described previously.

Block #5 performs the spiral searching for the 4 corner dots of a subject TAC and determines the orientation of the TAC within the memory which permits the logic of Block #6 to extract the encoded X-Y data stored in the memory and convert same (as described with respect to FIG. 15) into the desired data format for the coordinate data. This data is then transferred to the computer system where it may be used as X-Y input data for display or any other desired purposes.

Figure 10:
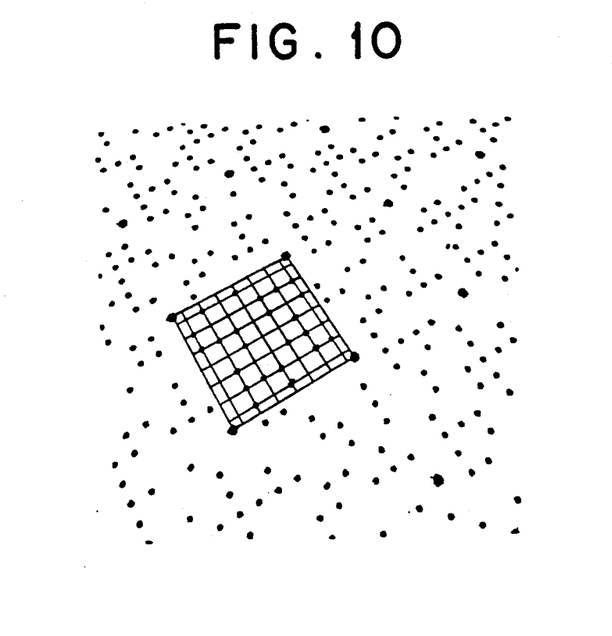
FIG. 10 comprises a diagrammatic illustration of the final step of the scan control mechanism which allows a complete X-Y coordinate pair of a single TAC to be read out and supplied to the computer system.

The following tabular description of the flow diagrams of FIGS. 12, 13, and 14 specifically recites the "best mode" algorithms for performing the recited operations within the Block 3 of FIG. 1 and shown graphically in FIGS. 8, 9, and 10 respectively. Their functions could be performed by software or by special hardware logic as will be well understood by those skilled in the art. A suitable two dimensional video memory would hold the requisite "picture" of the tablet taken by the stylus and could be a special purpose memory or the computer system memory could be used. The operations of FIGS. 12 thru 15 would, of course, be performed within this memory as will be well understood.

Block Description For Performing the "TAC Corner Search" Procedure of FIG. 12

Block #

1. Do spiral search (see FIG. 12b) starting at image space center, looking for two TAC corner features.

2. Check for two features found. If found, save locations and continue to Block #3, else corner search failed, proceed to Block #9, image search failed.

3. Predict the location of the two remaining TAC corners that bound the TAC which contains the center-of-image-space pixel. This prediction simply notes the orientation, length and relative location of the line drawn between the first two TAC corners found in image space and predicts the possible location of the remaining two TAC corners. This prediction need not be wholly accurate and can be inexpensively table driven. Proceed to Block #4.

4. Search for first predicted TAC corner. Proceed to Block #5.

5. If corner not found, continue to Block #9, TAC corners search failed. If found, save location and proceed to Block #6.

6. Search for second predicted TAC corner. Proceed to Block #7.

7. If corner not found, continue to Block #9, TAC corners search failed. If found, proceed to Block #8, save location.

8. All four TAC corners found, continue with processing.

9. Four TAC corners were not found, TAC acquisition fails, proceed to next sample point.

Block Description For Performing the "Spiral Search" Procedure of FIG. 13

Block #

1. Spiral search is initiated. The starting image space location (x,y) is specified, as is the desired number of TAC corner features to be found.

2. The bi-level pixel at current location (x,y) is tested for on state (reflective tablet feature present). If this pixel is on, begin corner test (Block #3), if not continue to next pixel along current search path (Block #6).

3. Attempt to identify this on state pixel as one belonging to a TAC corner feature (See FIG. 14 for further processing). If pixel is within a corner feature, continue to Block #4, if not, proceed to next pixel along current search path (Block #6).

4. The current pixel belongs to a corner feature, record calculated (from Block #3) corner location in image space and increment the number of corners found so far. Continue to Block #5 to see if the desired number of corners have been found.

5. Check to see if the desired number of TAC corner features have been found. If so, exit routine, returning number of corners found and their centroid locations in image space coordinates (Block #11).

6. Increment pixel test location from current location to a position along the current path which will not pass over any potential corner features. This distance is constant for all searches and may be equal to the smallest number of pixel unit lengths a corner feature may subtend (given all reasonable stylus incident angles). Continue to Block #7.

7. Test to see if new pixel test location is outside of defined image coordinate space. If it is, search fails, go to Block #11 and return number of corner features found. If pixel is within defined image space, continue to Block #8.

8. Test to see if trajectory of search along current path is complete. By definition, the length of each search path is increased as the search proceeds from its initial start location. The length of the current path and the amount to increment such length on succeeding search trajectories is part of the search procedures state information. The amount to increase each path is fixed for all searches and is related to the same dimension referenced in Block #6's description (above). If the current trajectory is exhausted, change direction of path trajectory (proceed to Block #9). If the search may continue along the current path, proceed to Block #2 to again search for corner features.

9. Change search path direction over image space and adjust new path length. Proceed to Block #10.

10. Adjust current pixel text location along new path direction to a significant feature distance away from path corner. Return to Block #2 to continue testing for corner feature presence.

11. Exit spiral search, returning the number of corner features found (if any) and their image space location.

Block Description For Performing the "Corner Detect Procedure of FIG. 14

Block #

1. Advance current (x,y) pixel location 1 pixel along current path.

2. Test if pixel at new location is on. If yes, proceed to Block #1. If off, proceed to Block #3.

3. The start and end of an "on" pixel span along a path has been recorded. Compute the middle of this span. Proceed to Block #4.

4. From the middle of the span derived in Block #3, advance one pixel in an orthogonal direction from the original span. Proceed to Block #5.

5. Test if pixel at new location is on. If yes, proceed to Block #4. If off, proceed to Block #6.

6. From the middle of the span derived in Block #3, advance one pixel in an orthogonal direction from the original span. This orthogonal direction is opposite to the direction taken in Block #4. Proceed to Block #7.

7. Test if pixel at new location is on. If yes, proceed to Block #6. If off, proceed to Block #8.

8. Given the horizontal and vertical "on" pixel spans detected above, determine if the detected feature is large enough to meet TAC corner dot size criteria If yes, proceed to Block #9, if not, return with Corner feature not present.

9. Compute center of corner feature, return with Corner feature present.

Figure 15:
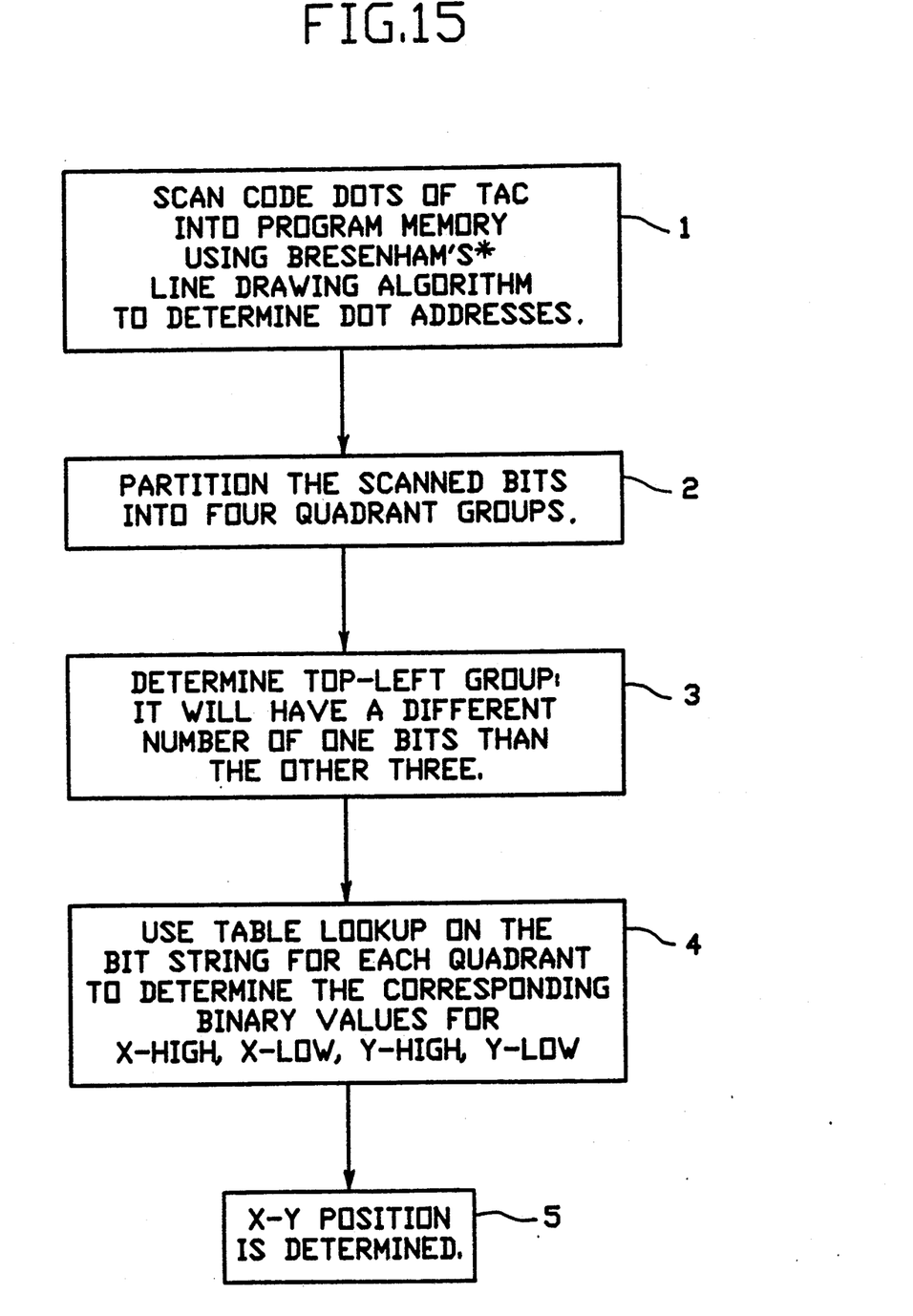
FIG. 15 comprises a high level flow chart of the algorithm which produces the final X-Y coordinate code readout for each TAC which is subsequently put into the computer system.

FIG. 15 comprises a flow chart of the final step of converting the acquired TAC data currently stored in the video program memory into the final binary encoded X-Y coordinate pair data produced by the present system.

It will be remembered that, prior to the procedure of FIG. 15 becoming active, all of the processing procedures of FIGS. 12, 13, and 14 will have completed and the system will have the precise coordinate in memory of the four (4) corner dots of the TAC being processed. These dots will limit the processing to the "gridded square" as illustrated in FIG. 10. The slope of the edge of the TAC will also be determined which allows the procedure of Block #1 to proceed to access the coded binary content of the TAC. Block #1 uses the Bresenham line-drawing algorithm to generate this data from the TAC data in memory. A literature reference to this well known algorithm is an article entitled "Algorithm For Computer Control of Digital Plotters" by Bresenham, J. E. in the IBM Systems Journal, Volume 14, No. 1, pages 25–30, 1965, which is available from the IBM T. J. Watson Research Center Library, Yorktown Heights, New York 10598.

In Block #2 the binary data developed in Block #1 is formatted into the four quadrant bit groups as indicated in FIG. 7 representative of the high and low order address segment of the overall X-Y address of the TAC on the tablet. In Block #3 the top left quadrant group is identified (which is the high-order X address) as having a different number of "1's" (greater or lesser) than the other three quadrants of the TAC, as described previously.

The system then proceeds to Block #4 where the bit strings for each quadrant starting with the upper left quadrant, are converted to the desired binary format for subsequent computer usage by a well-known table look up procedure, e.g., each quadrant code group is looked up and the resultant coded X or Y address read out. The output of this block comprises the 4 binary values corresponding to X-high, X-low, Y-high and Y-low.

Block #5 concatenates these four data address segments, transfers them to the computer system and, in effect, notifies the stylus-tablet system that the current procedure is finished. At this point the whole procedure beginning with FIG. 12 is repeated as many times as necessary.

A SPECIFIC IMPLEMENTATION EXAMPLE

To provide an example of the operator of the herein disclosed system, assume a desired digitizer resolution of 50 microns and a tablet size of 1 by 1 meter. Using a TAC size of 250 by 250 microns yields 16 million TACs on the tablet. This requires 24 bits to encode. Two more bits are needed to remove the rotational redundancies. Three bits in addition would give the "half ones" property mentioned above. If the large corner dots are allocated 2 by 2 dot spaces, this takes 4 code dots from each TAC, leaving 16 dots for error correction (a liberal amount) if a 7 by 7 dot array is used. This gives a dot center to center spacing of 36 microns, which can be organized for a dot diameter of 24 microns, and a narrowest "white space" between dots of 12 microns. These feature sizes can be easily acquired and discriminated with inexpensive photodetectors and lenses at infrared wavelengths. The image acquisition time at 1 meter per second stylus speed could be about 24 microseconds (the stylus moves only two-thirds of a dot space in that time), which also can be realized with inexpensive technology available today. The optical resolution would be on the order of the dot spacing, so the 50 micron figure would be achieved This would give a tablet readout resolution and accuracy of about 500/inch (linear).

The codes (TACs) could be put on the tablet in any of a variety of ways which are known and common techniques. Photolithography could be used to produce the mask, then the mask could be used to lay opaque or semi-opaque material on a glass or plastic substrate. Alternatively, techniques similar to and based on "CD" manufacturing could be used to produce a master used in stamping holes that comprise the patterns into a plastic layer that is subsequently protected by another smooth transparent layer that becomes the tablet surface. The significant requirement of the deposition-/etching procedure is that it be capable of producing an optically readable (preferably laser for definition of viewing area) binary code of the requisite data density. A "1" can be distinguished from a "0" in terms of a change of transmissivity, reflectivity, etc.

Having thus described a preferred embodiment of the present invention it will, of course, be apparent that many changes in form and detail could be made by those skilled in the art without departing from the spirit and scope of the invention as set forth in the appended claims.

As stated previously a number of different methods could be used to actually encode the X-Y coordinate data pairs of the tablet other than CD technology. Also, the format of the TAC could be changed as long as the individual TACs are readily distinguishable by the associated data acquisition and conversion means used. Also the details of the scanning and conversion algorithms could be changed by those skilled in the art. For example, if an oriented or rotationally constrained pen were utilized the scanning algorithms for locating the corner dots and determining the TAC orientation could be simplified or even eliminated. These and other changes will be obvious to those skilled in the art.

We claim:

1. A stylus locator and data input system for use in conjunction with an electronic computer system comprising in combination:

an optical stylus including an illumination source and a pick up means for detecting absolute binary location data from a passive digitizing tablet when said stylus is passed over the surface thereof, a passive locator tablet for use with said optical stylus member having permanently recorded thereon and distributed throughout the surface thereof a plurality of discrete sets of tablet address cells (TACs) each TAC comprising a digitally encoded X-Y coordinate pair which defines the absolute location of the TAC on the surface of said tablet, means on said tablet for unambiguously demarking the boundaries of individual TACs, the density of the TACs being at least 250,000 per square inch and;

means for periodically sampling TAC data picked up by said stylus as the stylus is passed over the surface of the tablet, and data generating means for producing a complete TAC data pair (X-Y coordinates) from each sampled unit of TAC data, said sampling rate being at least 125 per second.

2. A stylus locator and data input system as set forth in claim 1, wherein said data generating means includes means for utilizing said boundary demarking means to produce a complete TAC data pair at the approximate center of the stylus during any sampling period whereby data from any adjacent TACs is ignored.

3. A stylus locator and data input system as set forth in claim 2, said data generating means including means for utilizing said boundary demarking means for generating said TAC data independently of the rotational orientation of the stylus with respect to the tablet.

4. A stylus locator and data input system as set forth in claim 1, wherein said code comprises a two-dimensional, DC balanced binary code distributed over each individual TAC area.

5. A stylus locator and data input system as set forth in claim 4, wherein said code is organized into four quadrants representing the X-high, X-low, Y-high and Y-low addresses respectively and wherein a predetermined one of said code quadrants is characterized by having a different number (more or less) of encoded binary "1's" than the other three quadrants.

6. A stylus locator and data input system as set forth in claim 1 wherein said stylus pick-up means has a field of view sufficient to sense a plurality of TAC's along both axes of the tablet.

7. A stylus locator and data input system as set forth in claim 6, wherein said data generating means includes a video memory and means for storing a multi-pixel video image of each unit of TAC data sampled by said stylus, the granularity of said memory and stylus optical system being such that a code dot image stored therein is several pixels wide in both dimensions.

8. A stylus locator and data input system as set forth in claim 7, wherein the TAC demarking means comprises four corner dots orthogonally disposed with respect to each other and distinguishable from code dots comprising the X-Y coordinate data.

9. A stylus locator and data input system as set forth in claim 8, wherein the four TAC demarking corner dots occupy at least twice as many pixels in said memory as a code dot.

10. A stylus locator and data input system as set forth in claim 8, where said data generating means includes;
means for searching said memory containing said TAC data, said searching means including
means for performing a spiral search in said memory beginning at the center thereof and continuing said search until two corner dots are found and storing their coordinates,
means for predicting the approximate location of the two remaining corners,
means for performing a spiral search for said third corner beginning at the predicted location thereof,
means for performing a spiral search for the fourth corner dot beginning at the predicted location thereof,
means for storing the location of said third and fourth corners,
means for defaulting a search if a particular corner dot is not found and,
means for initiating a data acquisition search in said memory in a region bounded by said four corner dots to extract said four quadrants of X-Y coordinate data.

11. A stylus locator and data input system as set forth in claim 10 wherein said data acquisition and search means includes means for scanning consecutive lines with a TAC region and extracting the location of code dots therein representing a binary value using a Bresenham search procedure,
means for partitioning the complete extracted TAC data field into its four quadrants,
means for determining a predetermined code quadrant, and
means for successively looking up the four data quadrants containing the X-Y coordinates represented by said TAC in a table look-up means.

12. A stylus locator and data input system for use in conjunction with an electronic computer system comprising in combination:
an optical stylus including an illumination source and optical pick up means for detecting absolute binary location data from a passive digitizing tablet when said stylus is passed over the surface thereof,
a passive locator tablet for use with said optical stylus member having permanently recorded thereon and distributed throughout the surface thereof a high density of discreet sets of tablet address cells (TACs) each TAC comprising a digitally encoded X-Y coordinate pair which defines the absolute location of the TAC on the surface of said tablet,
means on said tablet for unambiguously demarking the boundaries of individual TACs,
means for periodically sampling TAC data picked up by said stylus as the stylus is passed over the surface of the tablet, and
data generating means for producing a complete TAC data pair (X-Y coordinates) from each sampled unit of TAC data,
said data generating means including means for utilizing said TAC boundary demarking means to produce a said complete TAC data pair at the approximate center of the stylus during any sampling period whereby data from any adjacent TACs is ignored and further including
a video memory and means for storing a multi-pixel video image of each unit of TAC data sampled by said stylus, the granularity of said memory and stylus optical system being such that a code dot image stored therein is several pixels wide in both dimensions.

13. A stylus locator and data input system as set forth in claim 12 wherein said stylus pick-up means is provided with means for viewing a plurality of TAC's along both axes of the tablet, and
the TAC demarking means comprises four corner dots orthogonally disposed with respect to each other and distinguishable from code dots comprising the X-Y coordinate data.

14. A stylus locator and data input system a set forth in claim 13 wherein said data generating means includes;
means for searching said TAC data, said searching means including
means for performing a spiral search in said memory beginning at the center thereof and continuing said search until a first two corner dots are found and storing their coordinates
means for predicting the approximate location of the two remaining corners,
means for performing a spiral search for said third corner beginning at the predicted location thereof,
means for performing a spiral search for the fourth corner dot beginning at the predicted location thereof,
means for storing the location of said third and fourth corners,
means for defaulting a search if a particular corner dot is not found, and
means for initiating a data acquisition search in said memory in a region bounded by said four corner dots to extract said four quadrants of X-Y coordinate data.

15. A stylus locator and data input system as set forth in claim 14, wherein said data acquisition and search means includes means for scanning consecutive lines with a TAC region and extracting the location of code dots therein representing a binary value using a Bresenham search procedure,
means for partitioning the complete extracted TAC data field into its four quadrants,
means for determining a predetermined code quadrant, based on the number of binary "1's" contained therein, and
means for successively looking up the four data quadrants containing the X-Y coordinates represented by said TAC in a table look-up means.

* * * * *